(12) United States Patent
Watson (10) Patent No.: US 12,034,824 B2
(45) Date of Patent: *Jul. 9, 2024

(54) PROCESSING DNS QUERIES TO IDENTIFY PRE-PROCESSING INFORMATION

(71) Applicant: Amazon Technologies, Inc., Seattle, WA (US)

(72) Inventor: Ryan F. Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,083

(22) Filed: Jul. 6, 2023

(65) Prior Publication Data
US 2023/0362276 A1    Nov. 9, 2023

Related U.S. Application Data

(63) Continuation of application No. 17/657,872, filed on Apr. 4, 2022, now Pat. No. 11,729,294, which is a continuation of application No. 16/203,405, filed on Nov. 28, 2018, now Pat. No. 11,303,717, which is a continuation of application No. 14/800,540, filed on Jul. 15, 2015, now Pat. No. 10,225,362, which is a
(Continued)

(51) Int. Cl.
| | |
|---|---|
| *H04L 67/5681* | (2022.01) |
| *G06F 16/955* | (2019.01) |
| *H04L 61/4511* | (2022.01) |
| *H04L 67/1014* | (2022.01) |
| *H04L 67/563* | (2022.01) |

(52) U.S. Cl.
CPC ...... *H04L 67/5681* (2022.05); *G06F 16/9566* (2019.01); *H04L 61/4511* (2022.05); *H04L 67/1014* (2013.01); *H04L 67/563* (2022.05)

(58) Field of Classification Search
CPC ............. H04L 67/5681; H04L 61/4511; H04L 67/1014; H04L 67/563
See application file for complete search history.

(56) References Cited

U.S. PATENT DOCUMENTS

| | | | | |
|---|---|---|---|---|
| 7,454,457 | B1 * | 11/2008 | Lowery | ............... H04L 67/1001 |
| | | | | 709/224 |
| 8,285,808 | B1 * | 10/2012 | Joel | ..................... H04L 61/4511 |
| | | | | 709/224 |

(Continued)

*Primary Examiner* — Philip C Lee
(74) *Attorney, Agent, or Firm* — Knobbe, Martens, Olson & Bear, LLP (57) ABSTRACT

Systems and methods for processing a DNS query to identify and implement pre-processing information by a DNS server component in anticipation of a corresponding content request from a client computing device are provided. The pre-processing information can correspond to identification of content to be preloaded or other actions to be implemented by one or more computing devices in association with an anticipated client content request. Based on identification of the content or future actions, a DNS server component can provide the pre-processing information to one or more computing devices, such as computing devices of a CDN service provider and/or an original content provider, in advance of a corresponding request for content from the client computing device in order to improve performance associated with responding to the client request.

20 Claims, 8 Drawing Sheets

Related U.S. Application Data continuation of application No. 13/493,839, filed on Jun. 11, 2012, now Pat. No. 9,154,551.

(56) References Cited

U.S. PATENT DOCUMENTS

| | | | |
|---|---|---|---|
| 2002/0007404 A1* | 1/2002 | Vange | H04L 67/1034 709/217 |
| 2004/0128346 A1* | 7/2004 | Melamed | H04L 9/40 707/E17.12 |
| 2005/0240574 A1* | 10/2005 | Challenger | G06F 16/9574 |
| 2006/0235941 A1* | 10/2006 | Arcas | H04L 67/5651 709/217 |

* cited by examiner

PROCESSING DNS QUERIES TO IDENTIFY PRE-PROCESSING INFORMATION

CROSS-REFERENCE TO RELATED APPLICATIONS

This application is a continuation of U.S. patent application Ser. No. 17/657,872, now U.S. Pat. No. 11,729,294, entitled "PROCESSING DNS QUERIES TO IDENTIFY PRE-PROCESSING INFORMATION" and filed Apr. 4, 2022, which is a continuation of U.S. patent application Ser. No. 16/203,405, now U.S. Pat. No. 11,303,717, entitled "PROCESSING DNS QUERIES TO IDENTIFY PRE-PROCESSING INFORMATION" and filed on Nov. 28, 2018, which is a continuation of U.S. patent application Ser. No. 14/800,540, now U.S. Pat. No. 10,225,362, entitled "PROCESSING DNS QUERIES TO IDENTIFY PRE-PROCESSING INFORMATION" and filed on Jul. 15, 2015, which in turn is a continuation of U.S. patent application Ser. No. 13/493,839, now U.S. Pat. No. 9,154,551, entitled "PROCESSING DNS QUERIES TO IDENTIFY PRE-PROCESSING INFORMATION" and filed on Jun. 11, 2012, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages or resources identified in Web pages, through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to processing of a domain name service ("DNS") query from a client computing device by a DNS server component, such as one or more DNS server components provided by a content delivery network ("CDN") service provider or by any other DNS service provider. Specifically, aspects of the disclosure will be described with regard to processing a DNS query to identify and implement pre-processing information by a DNS server component in anticipation of a corresponding resource request from a client computing device to a computing device identified by the DNS server component responsive to the DNS query. Illustratively, the pre-processing information can correspond to identification of content to be accelerated or other actions to be implemented by one or more computing devices in association with an anticipated content request. Based on identification of the content or future actions, a DNS server component can provide the pre-processing information to one or more computing devices, such as computing devices of a CDN service provider and/or an original content provider, in advance of a corresponding request for content from the client computing device in order to improve performance associated with responding to this request.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider or DNS service provider, that may or may not provide additional services and functionality including network-based storage services, caching services, application hosting, or other services. Accordingly, use of the term "service provider" is not intended to be limited to any particular type of service provider, whether discussed or described in examples. Accordingly, one skilled in the relevant art will appreciate that a service provider need not provide all, or any, of the additional services or functionality that may be associated with some service providers, such as a CDN service provider.

Figure 1:
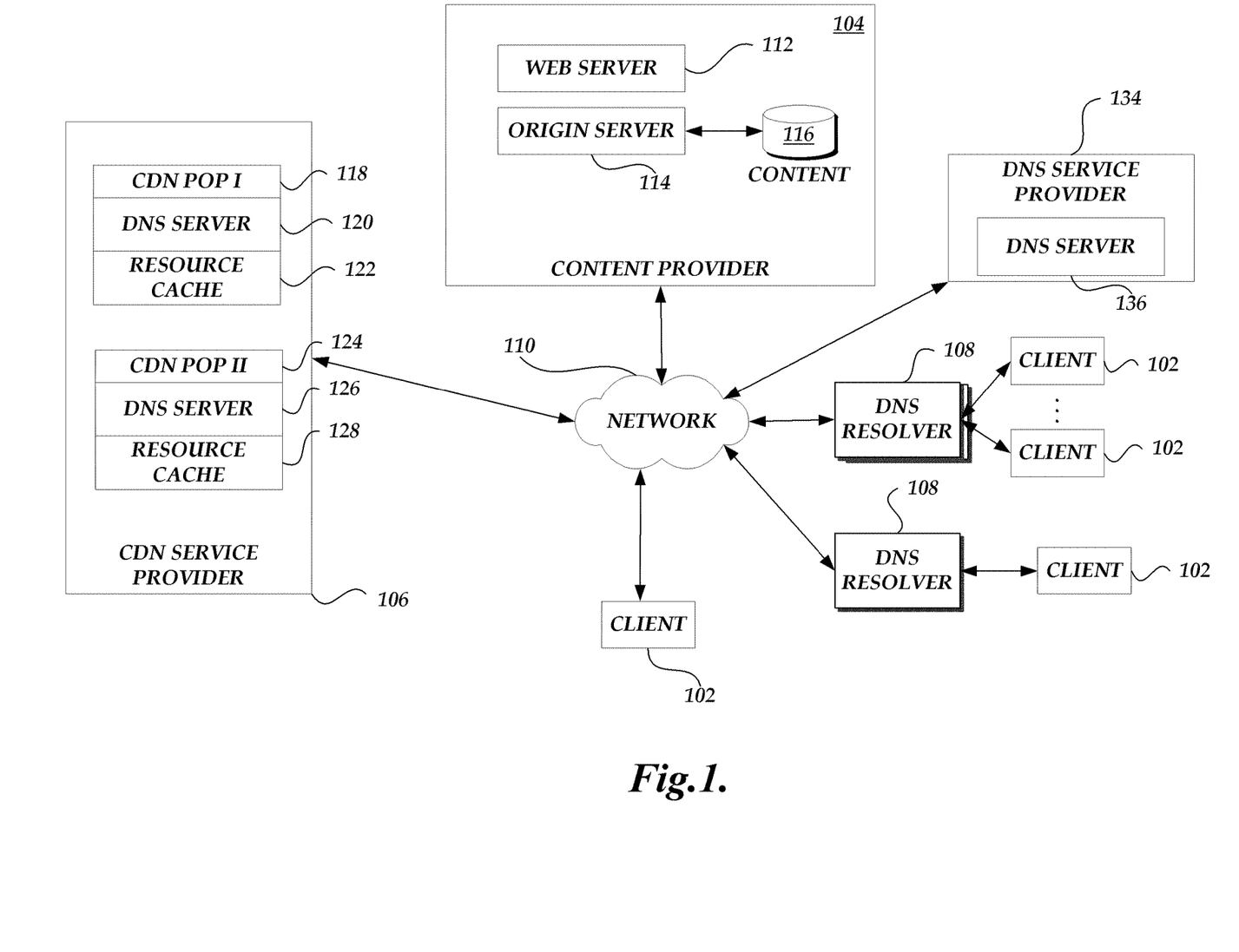
FIG. 1 is a block diagram illustrative of content delivery environment including a number of client computing devices, a content provider, and a content delivery network (CDN) service provider.

FIG. 1 is a block diagram illustrative of content delivery environment 100 for managing registration of a content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider and/or a CDN service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 110, such as a wide area network or local area network. For example, the client computing devices 102 may be equipped with networking equipment and browser software applications that facilitate communications via the Internet or an intranet.

Illustratively, at least some of the client computing devices 102 utilize a DNS resolver component 108, such as a DNS name server, that receives DNS queries from a client computing device 102 and then generates the DNS queries attributed to the client computing device, or on behalf of the client computing device. In one embodiment, the DNS resolver component 108 may be a local DNS component provided by an enterprise network to which the client computing device 102 belongs. In another embodiment, the local DNS resolver component 108 may be provided by an Internet Service Provider ("ISP") that provides the communication network connection to the client computing device 102. In embodiments in which the client computing devices 102 utilize a DNS resolver component 108, one skilled in the relevant art will appreciate that the DNS queries generated on behalf of the client computing devices would be associated with the IP address of the DNS resolver component 108 in accordance with traditional networking protocols.

The content delivery environment 100 can also include a content provider 104 in communication with the one or more client computing devices 102 via the communication network 110. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage component 116 may be geographically distributed throughout the communication network 110 in a manner to best serve various demographics of client computing devices 102.

Although not illustrated in FIG. 1, the content provider 104 can be associated with a number of additional or supplemental components to facilitate interaction with client computing devices 102 or service providers. For example, a content provider 104 may maintain one or more DNS name server components that are operative to receive DNS queries related to registered domain names associated with the content provider 104. The one or more DNS name servers can be authoritative to resolve client computing device DNS queries corresponding to the registered domain names of the content provider 104. The content provider 104 can also maintain additional storage components, such as proxy servers, or utilize network storage service providers to maintain at least a portion of the content/resources provided to the client computing devices 102.

With continued reference to FIG. 1, the content delivery environment 100 can further include a service provider, generally referred to as the CDN service provider 106, in communication with the one or more client computing devices 102 and the content provider 104 via the communication network 110. The CDN service provider 106 illustrated in FIG. 1 corresponds to a logical association of one or more computing devices associated with a service provider. Specifically, the CDN service provider 106 can include a number of Point of Presence ("POP") locations 118, 124 that correspond to nodes on the communication network 110. Each POP 118, 124 includes a DNS component 120, 126 made up of a number of DNS server computing devices for resolving DNS queries from the client computers 102. Each POP 118, 124 also optionally includes a resource cache component 122, 128 made up of a number of cache server computing devices for storing resources from content providers or network storage providers and transmitting various requested resources to various client computers 102. The DNS components 120, 126 and the resource cache components 122, 128 may further include additional software and/or hardware components that facilitate communications including, but not limited, load balancing or load sharing software/hardware components.

In an illustrative embodiment, the DNS component 120, 126 and resource cache component 122, 128 are considered to be logically grouped, regardless of whether the components, or portions of the components, are physically separate. Additionally, although the POPs 118, 124 are illustrated in FIG. 1 as logically associated with the CDN service provider 106, the POPs will be geographically distributed throughout the communication network 110 in a manner to best serve various demographics of client computing devices 102. Additionally, one skilled in the relevant art will appreciate that the CDN service provider 106 can be associated with various additional computing resources, such additional computing devices for administration of content and resources, and the like. Even further, the components of the CDN service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems, and subsystems for facilitating communications may be utilized.

With continued reference to FIG. 1, the content delivery environment 100 can further include another service provider, generally referred to as a DNS service provider 134, in communication with the one or more client computing devices 102, the content provider 104, and the CDN service provider 106 via the communication network 110. The DNS service provider 134 illustrated in FIG. 1 corresponds to a logical association of one or more computing devices associated with a service provider. Specifically, the DNS service provider 134 can include one or more DNS components 136 made up of a number of DNS server computing devices for resolving DNS queries from the client computers 102. Illustratively, the DNS service provider 134 would not necessarily include any additional functionality and may provide a DNS request routing service in lieu of any DNS request routing functionality provided by another service provider, such as the CDN service provider 106.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
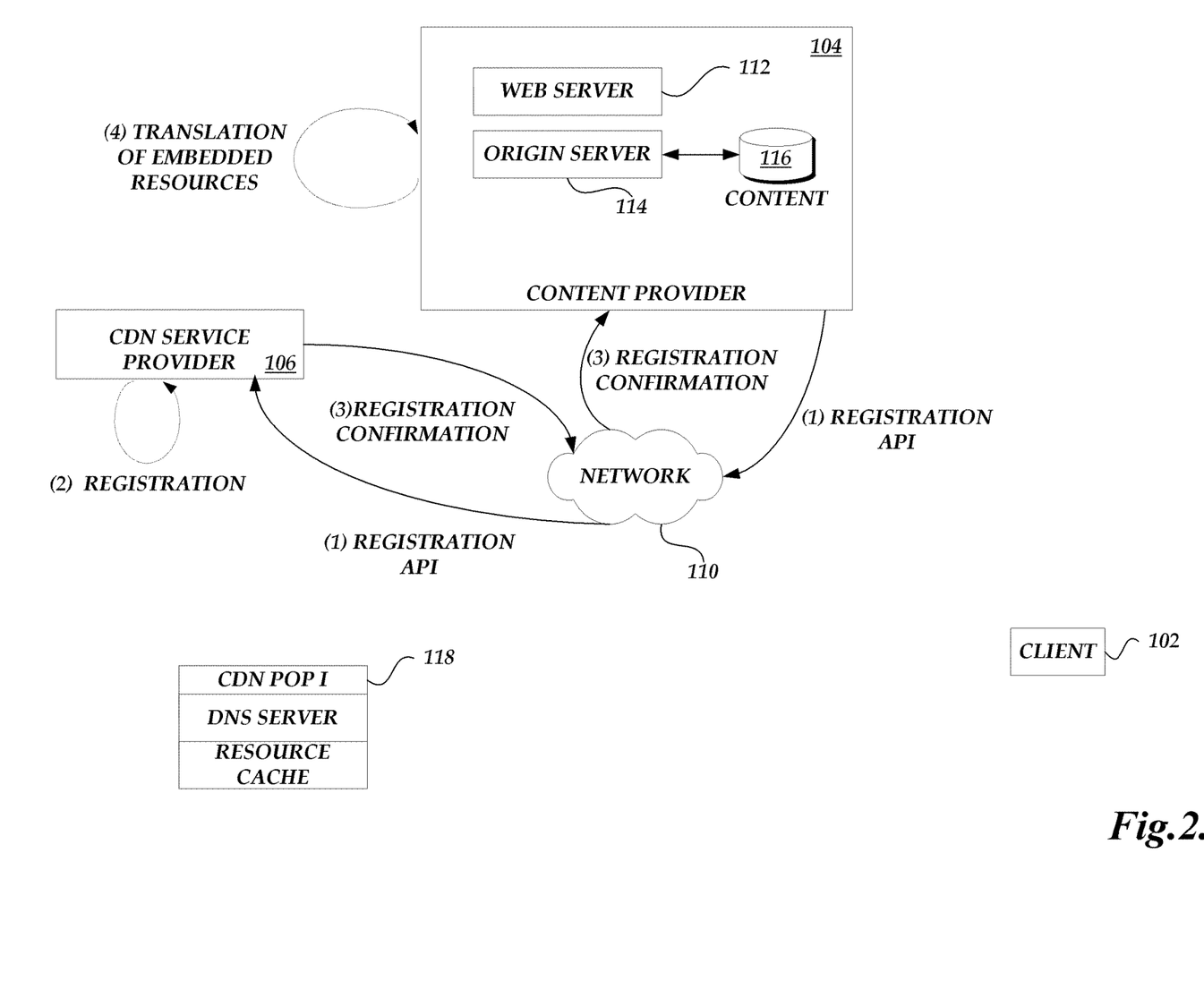
FIG. 2 is a block diagram of the content delivery environment of FIG. 1 illustrating the registration of a content provider with a CDN service provider.

With reference to FIG. 2, an illustrative interaction for the optional registration of a content provider 104 with a CDN service provider 106 for hosting content on behalf of the content provider 104 will be described. As illustrated in FIG. 2, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. Illustratively, the registration API can include the identification of the origin server 114 of the content provider 104 that may provide requested resources to the CDN service provider 106. In addition or alternatively, the registration API can include the content to be stored by the CDN service provider 106 on behalf of the content provider 104. Additionally, the content provider 104 can specify one or more network storage providers (not illustrated) that may act as an origin server for the content provider 104.

One skilled in the relevant art will appreciate that upon identification of appropriate origin servers 114, the content provider 104 can begin to direct requests for content from client computing devices 102 to the CDN service provider 106. Specifically, in accordance with DNS routing principles, a client computing device request corresponding to a resource identifier would eventually be directed toward a POP 118, 124 associated with the CDN service provider 106. In the event that the resource cache component 122, 126 of a selected POP does not have a copy of a resource requested by a client computing device 102, the resource cache component will request the resource from the origin server 114 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the CDN service provider 106. The translated URLs are embedded into requested content in a manner such that DNS queries for the translated URLs will resolve to a DNS server corresponding to the CDN service provider 106 and not a DNS server corresponding to the content provider 104.

Generally, the identification of the resources embedded in a base requested resource (e.g., a Web page) and originally directed to the content provider 104 will be in the form of resource identifiers that can be processed by the client computing device 102, such as through a browser software application. In an illustrative embodiment, the resource identifiers can be in the form of a uniform resource locator ("URL"). Because the resource identifiers included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, in some embodiments, as will also be described further below, the translated URL can include additional processing information (e.g., "additional information") in a DNS portion of the URL. The DNS portion of the URL includes information that is accessible by a DNS server during DNS query processing, while a path portion of the URL is not traditionally accessible or used during DNS query processing. The translated URL would have the form of:

http://additional_information.cdnprovider.com/path/resources.xxx

In the foregoing illustrative embodiment, the DNS portion of the translated URL, which is used by a DNS server during DNS query processing, comprises "additional-_information-.cdnprovider.com", while the path portion of the translated URL comprises the "/path/resources.xxx" portion of the above URL.

Figure 3:
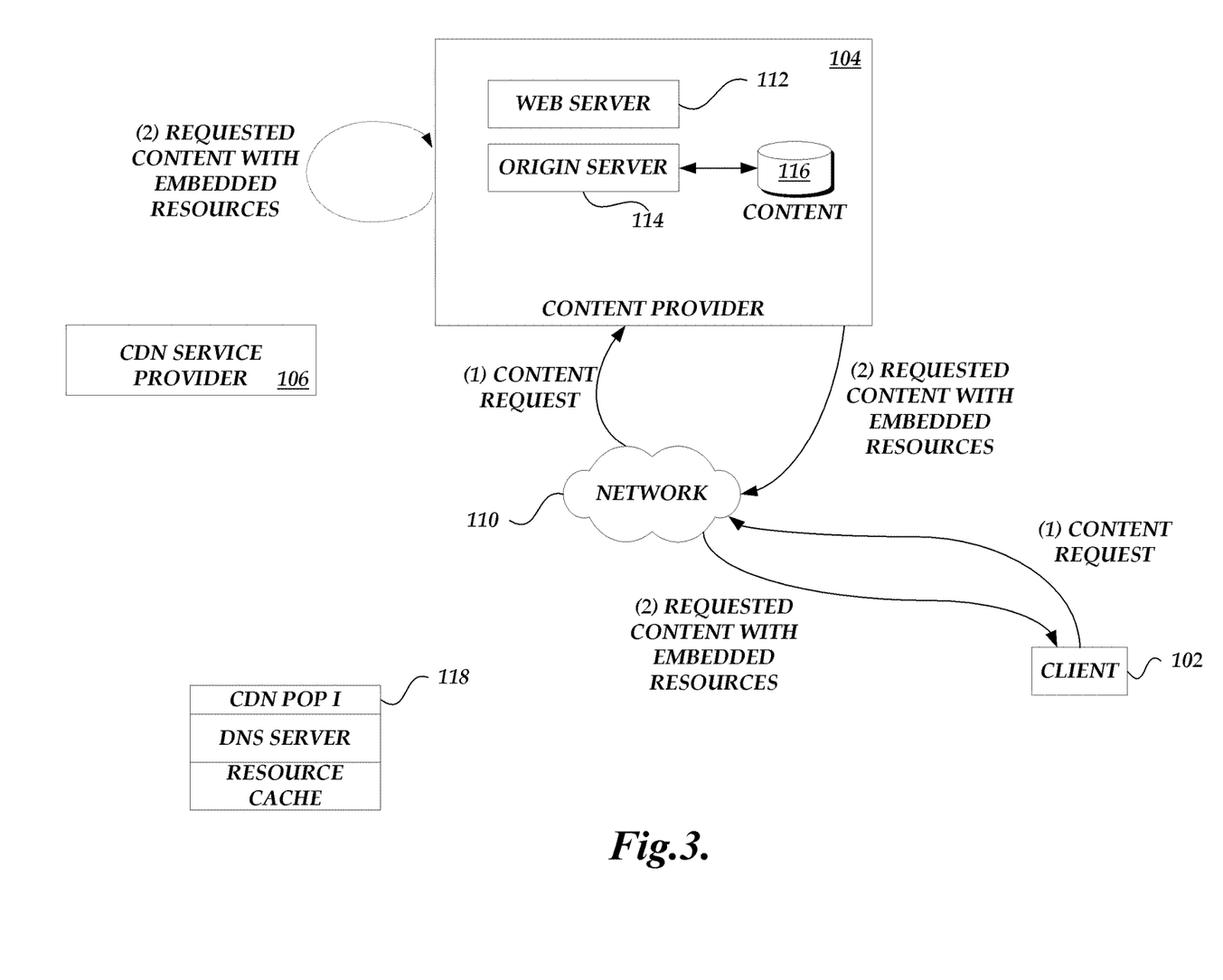
FIG. 3 is a block diagram of the content delivery environment of FIG. 1 illustrating the generation of resource requests by a client computing device to a content provider.

With reference now to FIG. 3, after completion of the registration and translation processes illustrated in FIG. 2, a client computing device 102 generates a content request for the base requested resource that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies and returns the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that corresponds to resource objects that should be obtained by the client computing device 102 as part of the processing of the requested content. The embedded resources can correspond to multi-media content, such as images, videos, text, etc. that will be processed by the client computing devices 102 and rendered on an output device.

Figure 4A:
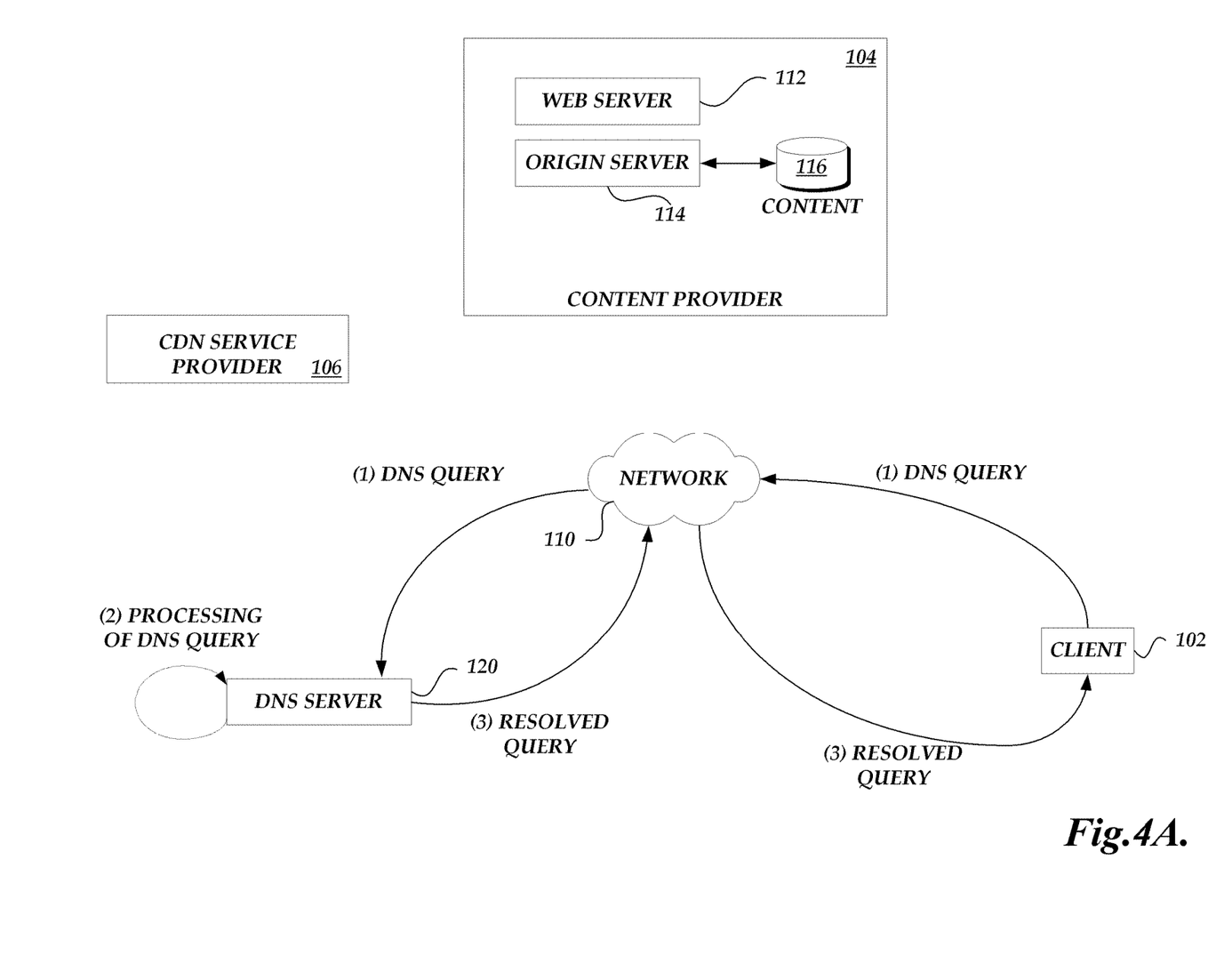
FIG. 4A is a block diagram of the content delivery environment of FIG. 1 illustrating the generation of DNS queries by a client computing device to a DNS server component.

With reference now to FIG. 4A, in one embodiment, upon receipt of the requested content as shown in FIG. 2, the client computing device 102 processes the received information in a manner that causes the client computing device 102 to request one or more embedded resources from the CDN service provider 106. As illustrated in FIG. 4A, in accordance with traditional communication protocols, the client computing device 102 would first transmit a DNS query to request an IP address of a computing device corresponding to each embedded resource.

By way of example, in accordance with traditional DNS request routing principles, resolving a DNS query for the embedded resource URL, http://www.CDNserviceprovider-.com/path/resource.xxx, would first include the partial resolution of the URL by identification of a DNS server authoritative to the "." and the "com" portions of the URL. The issuance of DNS queries corresponding to the "." and the "com" portions of a URL are well known and have not been illustrated. After partially resolving the embedded resource URL for the "." and "com" portions of the URL, the resolution of the DNS query for the embedded resource URL would then include the identification of the DNS server corresponding to the ".CDNserviceprovider" portion of the URL, such as DNS server component 120 of POP 118 or a DNS server component 136 of the DNS service provider 134. In the embodiment illustrated in FIG. 4A, the DNS server component 120 of POP 118 has been identified as corresponding to the ".CDNserviceprovider" portion of the URL.

As further illustrated in FIG. 4A, the receiving DNS server component 120 obtains the DNS query from the client computing device 102 and processes the DNS query. In accordance with traditional networking principles, because the DNS server component 120 is authoritative for the URL, the DNS server component 120 thus resolves the query by providing the client computing device 102 with the identification of an IP address that can provide the corresponding requested content, such as a resource cache component 128 of the POP 124. In addition, in accordance with the present disclosure, the DNS server component 120 also processes the DNS query to identify pre-processing information, such as identification of content to be accelerated or other actions to be implemented by one or more computing devices in association with an anticipated content request from the client computing device 102, as will be further described below.

In one embodiment, the DNS server component 120 may identify the embedded resource that will be requested by the client computing device 120 in association with the DNS query. Identification of the embedded resource may be determined by parsing information from a DNS portion of the resource identifier corresponding to the DNS query. For example, identification of the embedded resource may be included as the additional information in the DNS portion of the resource identifier. If the embedded resource is an image, such as image1.jpeg, the resource identifier would include this information as prepended information in the DNS portion of the resource identifier as follows:

http://image1.jpeg.D1.cdnprovider.com/path/resource.xxx

As another example, if the embedded resource is a video, the resource identifier could include information identifying the video, as well as other related information such as resolution, in the DNS portion of the resource identifier as follows:

http://video1.avi.resolution.D1.cdnprovider.com/path/resource.xxx

Alternatively, the information about the video file could be combined or otherwise referenced via a lookup, such as in the following resource identifier:

http://videolookupcode_x.cdnprovider.com/path/resource.xxx

Other information may also be included in the DNS portion of the above URLs, such as identification of the original content provider, D1, associated with the requested content. Accordingly, in one embodiment, the DNS server component 120 may alternatively or additionally parse the DNS query to obtain original content provider information.

In one embodiment, the additional information included in the DNS portion of the resource identifier can be included by the content provider 104 as a part of the translation process described above in reference to FIG. 2. In another embodiment, a client computing device could dynamically generate one or more modified resource identifiers itself. For example, the client computing device may identify that it requires a resource to be provided with a particular resolution suitable for the client computing device and, as a result, dynamically modify the resource identifier to include the necessary additional information in the DNS portion of the resource identifier to enable pre-processing of the resource at the particular resolution. In this embodiment, the client computing device is modified to include a module for dynamically translating embedded resources prior to issuing corresponding DNS queries.

Returning to the DNS query processing of FIG. 4A, and as will be described in further detail below in reference to FIG. 4B, the DNS server component 120 may identify the pre-processing information for provision to one or more computing devices that may subsequently process the pre-processing information to identify and take one or more actions. Alternatively, the pre-processing information identified by the DNS server component may also include identification of the one or more actions and instructions for the one or more computing devices to implement the one or more actions.

For example, in one embodiment, the DNS server component 120 simply identifies the embedded resource and provides information regarding the anticipated request for the embedded resource to the cache server component that the DNS server component 120 identified responsive to the client's DNS query, i.e., the resource cache component 128 of the CDN service provider 106. In this case, the cache server component 120 can identify whether the embedded resource is readily available in cache or whether it will need to be preloaded by virtue of a request to the origin server 114. In another embodiment, the DNS server component 120 can both identify the embedded resource and instruct the CDN service provider 106 and/or content provider to take a particular action, such as preloading the embedded resource, if it is not available, at the CDN service provider in anticipation of the request for the embedded resource from the client computing device 102.

In another embodiment, the DNS server component 120 may simply identify that a request for a resource, such as an embedded resource, is going to be made by the client and that a communications channel, such as a TCP connection, will need to be opened with an origin server to ultimately obtain the resource. For example, the resource may not be readily available at the CDN service provider to which the resource request will be directed as a result of the resolution of the DNS query and, in this case, the DNS server component 120, may identify that the action of opening a communications channel between the CDN service provider 106 and the origin server 114 will be required. The DNS server component 120, as will be further described below in reference to FIG. 4B, provides this pre-processing information to either the resource cache component that will receive the resource request and/or the original content provider 104 for purposes of one or both of those computing devices opening a communications channel in anticipation of the resource request. In other embodiments, instead of opening a communications channel, the pre-processing information may be to keep a communications channel open, to reset a time to live (TTL) associated with a communications channel, to open multiple communications channels in order to handle a large content request, and the like.

In yet another embodiment, the DNS server component 120 may identify that a request for content which resides at the resource cache component 128 will be made, but that the requested content will need to be converted into a different format. The DNS server component 120 may thus determine that the requested content will need to be transcoded before provision to the client computing device 106 and provide this pre-processing information to the resource cache component 128 prior to the client content request as will also be further described in reference to FIG. 4B below. The pre-processing information can comprise instructions to complete the identified action or simply the relevant information for the receiving computing device to identify the action to be taken in anticipation of the particular client content request.

Figure 4B:
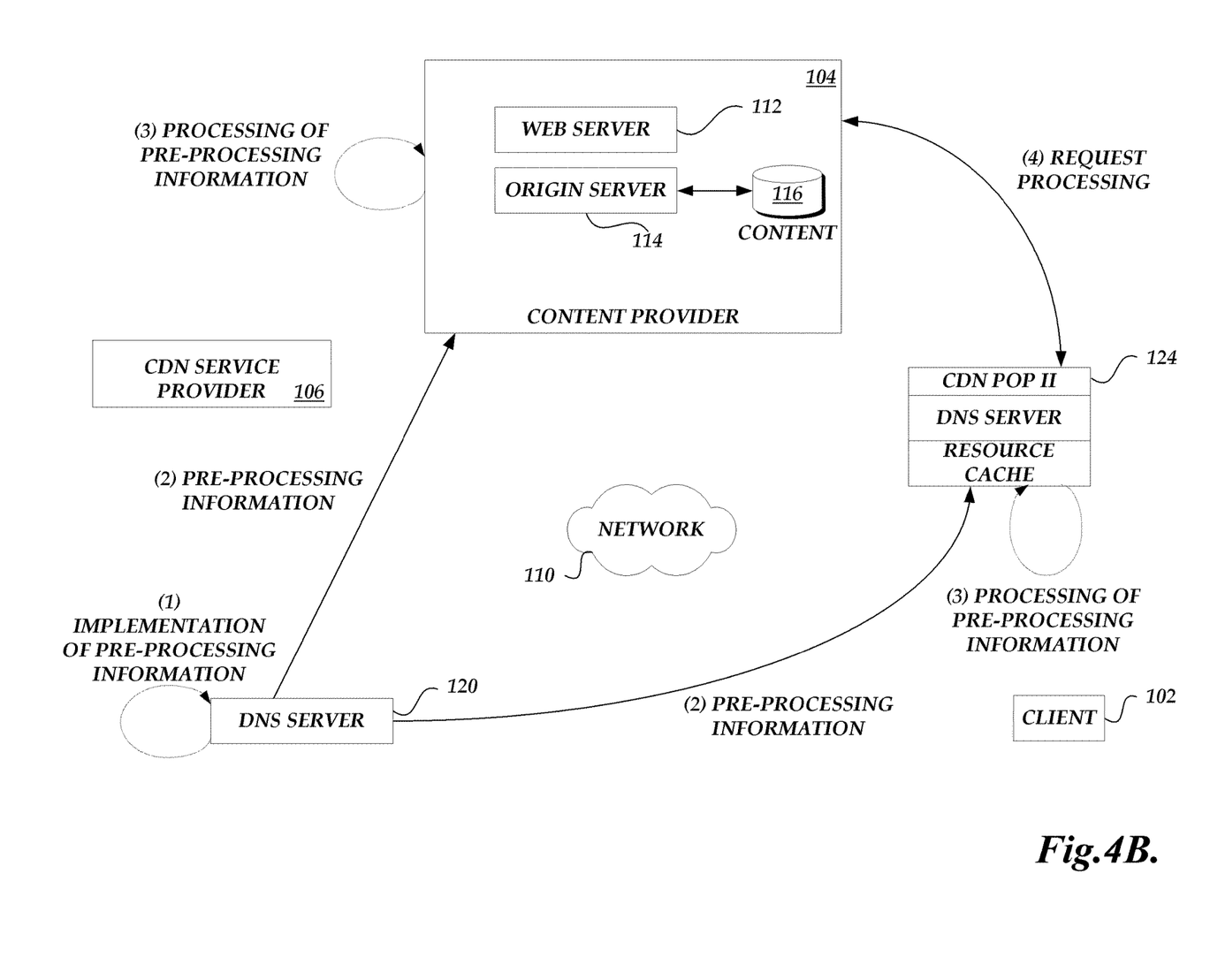
FIG. 4B is a block diagram of the content delivery environment of FIG. 1 illustrating the implementation of pre-processing information by a DNS server component.

Turning now to FIG. 4B, the DNS server component 120 implements the identified pre-processing information determined from the DNS query as discussed above in reference to FIG. 4A. As a result, the DNS server component 120 provides the identified pre-processing information to the appropriate computing device, such as the original content provider 104 or another identified server component for resolving the anticipated client resource request, i.e., the resource cache component 128 of the CDN service provider 106 in accordance with the current example, or both. The content provider 104 and/or the resource cache component 128 then processes the received pre-processing information to take action in advance of the anticipated client resource request. This action may include opening a communications channel, preloading the requested content at the resource cache component 128 if it is not otherwise available, commencing transcoding of content into an appropriate format for the anticipated resource request, and the like. Ultimately, the action can be any action that would help speed up processing of an anticipated resource request from a client computing device 102. Again, as similarly set forth above, the action may be identified by the DNS server component 120 and provided to the content provider 104 and/or the resource cache component 128 in the form of instructions to implement the action. Alternatively, the pre-processing information may simply include the necessary information for the content provider 104 and/or resource cache component 128 to determine the necessary pre-processing action required in anticipation of the client resource request. As shown in FIG. 4B, the processing of the pre-processing information at the content provider 104 and/or resource cache component 128 may also require request processing between the content provider 104 and the resource cache component 128.

For example, in one embodiment, the DNS server component 120 may have identified an embedded resource that will be requested by the client computing device 120 in association with processing the DNS query. In one embodiment, the DNS server component 120 implements this identified pre-processing information by sending instructions to the resource cache component 128 to preload the identified embedded resource if it is not already available at the resource cache component 128. For example, this result may be common for dynamic content that is not typically cached at the CDN service provider 106, as opposed to static content that is often already cached and available to be immediately provided in response to a resource request from a client computing device. As a result, the resource cache component 128 may request the opening of a communications channel with the content provider 104 in anticipation of the resource request from the client computing device 102. In addition, the resource cache component 128 may also request preloading of the identified embedded resource at the resource cache component 128 from the origin server 114. In other embodiments, the implementation of this pre-processing information may result in the DNS server component 120 instead directly instructing the content provider 104 to open a communications channel with the resource cache component 128, particularly where the DNS server component 120 can identify the original content provider 104, such as through parsing information in a DNS portion of a corresponding DNS query.

In another embodiment, the implementation of the pre-processing information may simply include identification that a communications channel will need to be opened in anticipation of a resource request from the client computing device and thus result in the DNS server component 120 sending instructions to the content provider 104 and/or resource cache component to open a communications channel. The communications channel may be a channel between the origin server 114 and the resource cache component 128. The content provider 104 and/or the resource cache component 128, in turn, process the pre-processing information and take the corresponding anticipatory action, which in this embodiment is opening of a communications channel in anticipation of the client resource request.

In yet another embodiment, the implementation of the pre-processing information may involve identifying that an embedded resource corresponding to an anticipated request from the client computing device 102 needs to be in a particular format and thus result in the DNS server component 120 sending instructions to the resource cache component 128, for example, to start conversion of the embedded resource, such as a video file, into an appropriate format for responding to the anticipated client resource request.

Figure 5:
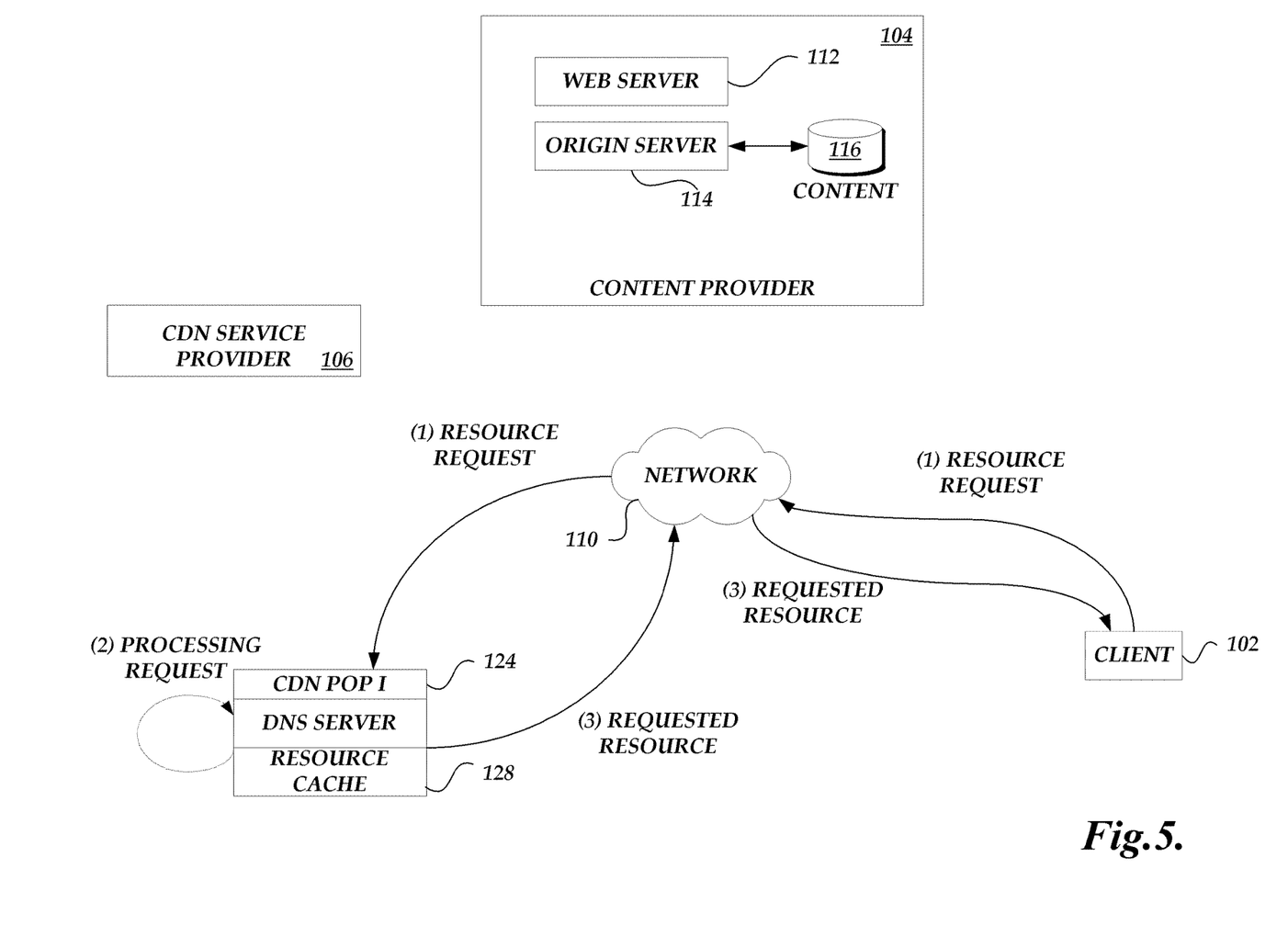
FIG. 5 is a block diagram of the content delivery environment of FIG. 1 illustrating the generation of resource requests by a client computing device to a CDN service provider.

With reference now to FIG. 5, upon receipt of the resolved DNS query, the client computing device 102 transmits a request for the content to the identified IP address corresponding to the resource cache component that can provide the requested content, i.e., resource cache component 128 in accordance with the foregoing embodiment. In accordance with an embodiment utilizing the hypertext transfer protocol ("HTTP"), the request of a resource can correspond to a GET request transmitted by the client computing device 102 to an IP address associated with CDN service provider 106. In this embodiment, the content request is received and processed by the resource cache component 128. Responsive to this request, the resource cache component 128 provides the resource to the client computing device 102. Upon receipt, the requested resource is processed by the browser application on the client computing device 102 as appropriate. It will be appreciated by one skilled in the relevant art that a selected resource cache component 122, 128 can either provide the requested resource if it is available or attempt to obtain the requested resource from another source, such as a peer cache server computing device or the origin server 114 of the content provider 104.

Figure 6:
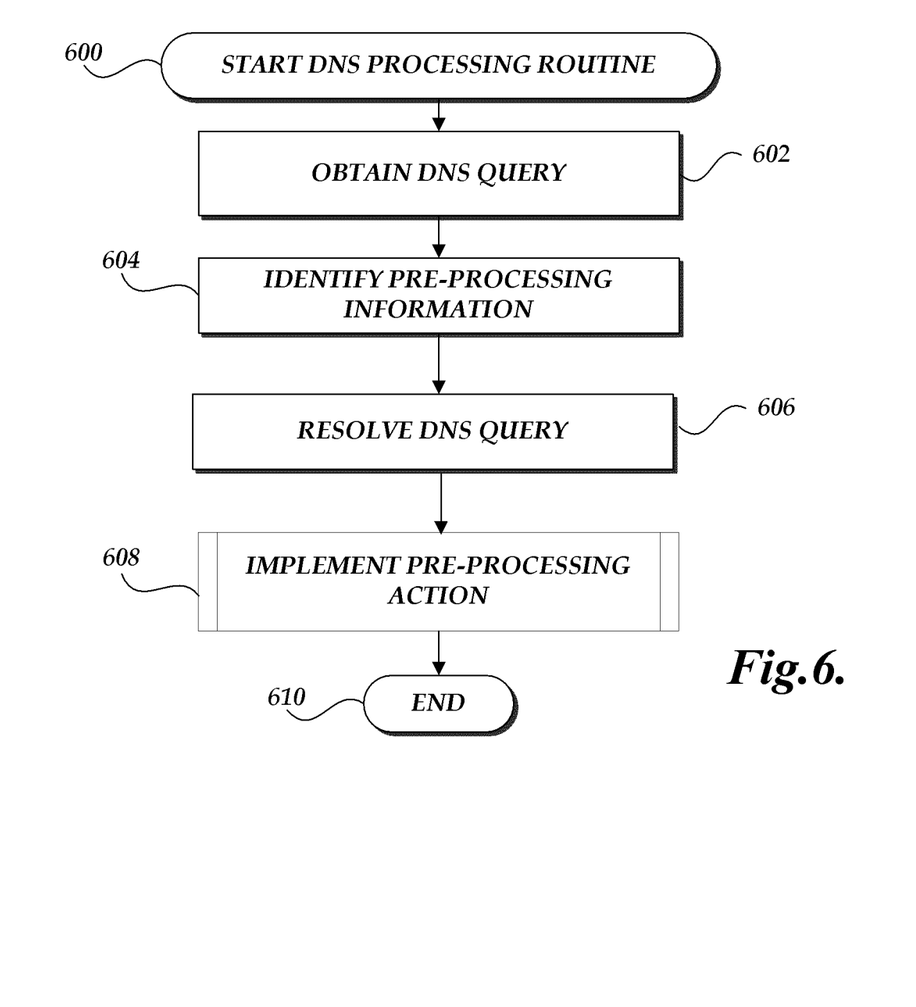
FIG. 6 is a flow diagram illustrative of a DNS query processing routine implemented by a DNS server component.

With reference now to FIG. 6 one embodiment of a routine 600 implemented by a DNS server component 120, 126 of the CDN service provider 106 or a DNS server component 136 of a DNS service provider 134 for processing DNS queries to identify pre-processing information will be described. One skilled in the relevant art will appreciate that actions/steps outlined for routine 600 may be implemented by one or many computing devices/components that are associated with the CDN service provider 106 or DNS service provider 134. Accordingly, routine 600 has been logically associated as being generally performed by a DNS server component of the CDN service provider 106 or DNS service provider 134, and thus the following illustrative embodiments should not be construed as limiting.

At block 602, the DNS server component obtains a DNS query corresponding to a resource identifier. As previously discussed, the resource identifier can be a URL that has been embedded in content requested by the client computing device 102 and previously provided by the content provider 104 and/or otherwise modified by a client computing device to include additional information particular to the client computing device. At block 604, the DNS server component identifies pre-processing information associated with the DNS query and/or the corresponding resource identifier. As set forth above, the pre-processing information may include identification of content to be preloaded or other anticipated actions required to respond to an anticipated client content request.

At block 606, the DNS server component resolves the DNS query by determining an IP address of a computing device that can provide the requested content, such as a resource cache component 128 of the POP 124, and transmitting the IP address to the client computing device 102. It should be appreciated that blocks 604 and 606 are both associated with processing of the DNS query and, as such, could be performed in any order or simultaneously.

At block 608, the DNS server component performs a subroutine for implementing one or more pre-processing actions associated with the identified pre-processing information. As set forth above, the implementation of pre-processing information may include providing the identified pre-processing information to the appropriate computing device, such as the original content provider 104, the resource cache component 128, or both, or sending instructions to the appropriate computing device to take a particular action in advance of the anticipated client resource request. This action may include opening a communications channel, preloading the requested content at the resource cache component 128 if it is not otherwise available, commencing transcoding of content into an appropriate format for the anticipated resource request, and the like. Ultimately, the action can be any action that would help speed up processing of an anticipated resource request from a client computing device 102. At block 610, the routine 600 terminates.

Figure 7:
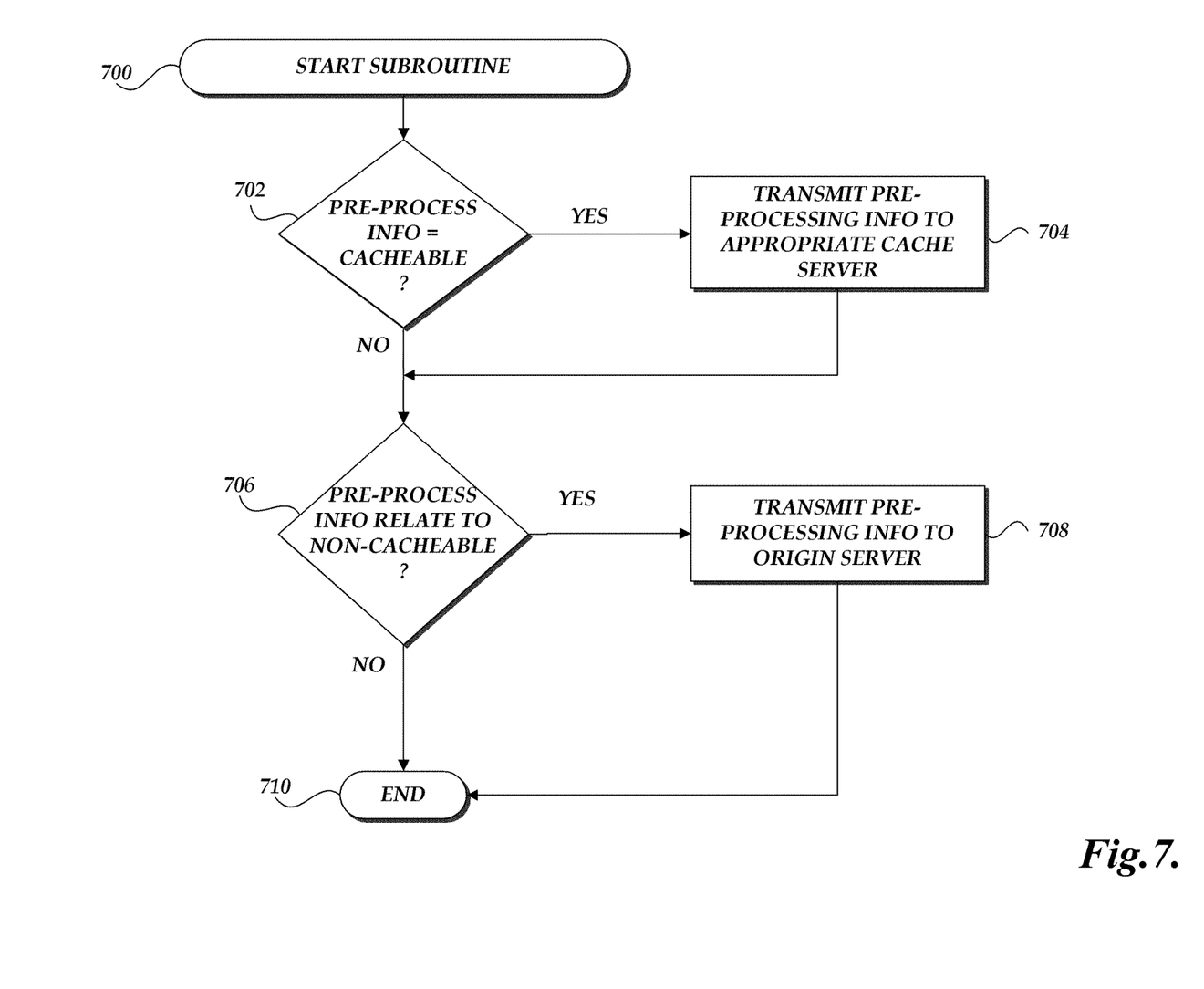
FIG. 7 is a flow diagram illustrative of a subroutine for implementation of pre-processing actions based on a DNS query as provided in the flow diagram of FIG. 6.

With reference now to FIG. 7, one embodiment of a subroutine routine 700 for implementing one or more pre-processing actions as set forth at block 608 of FIG. 6 will be described. Specifically, a DNS server component at a service provider, such as the DNS service provider 134 or CDN service provider 106, can utilize pre-processing information to anticipate actions which will be required to respond to a client content request. One skilled in the relevant art will appreciate that actions/steps outlined for subroutine 700 may be implemented by one or many computing devices/components that are associated with the DNS service provider 134 or CDN service provider 106. Additionally, routine 700 may be implemented by a combination of components from the DNS service provider 134 and CDN service provider 106 in embodiments in which both service providers share common control or ownership. Accordingly, subroutine 700 has been logically associated as being performed by a DNS server component of the DNS service provider 134 or CDN service provider 106.

At a block 702, a DNS server component performs a test to determine whether the identified pre-processing information includes identification of cacheable content. For example, the DNS server component identifies the embedded resource that a client computing device will request upon resolution of the DNS query. As set forth above, information about the embedded resource is included in the DNS portion of the resource identifier, and the DNS server component identifies this embedded resource by parsing the DNS portion of the DNS query. Once the embedded resource is identified, the DNS server component identifies whether the embedded resource comprises cacheable content. Static content in a Web page, for example, is considered cacheable, while dynamic content is typically not. Essentially, the DNS server component is determining whether the embedded resource is likely to be available at the resource cache component corresponding to the IP address provided to the client computing device in response to the DNS query.

If the answer at block 702 is yes, the DNS server component transmits pre-processing information to the resource cache component. In one embodiment, the pre-processing information may include instructions or information for the resource cache component to perform some preliminary processing action in anticipation of the request from the client computing device for the embedded resource, such as opening of one or more communications channels between nodes at a POP of the CDN service provider in order to, for example, move content as close as possible to a cache component that will service the anticipated request for content. In another embodiment, the pre-processing information may include identification of a format of the embedded resource required to respond to an anticipated request from the client computing device 102 for the embedded resource and/or instructions associated with commencing conversion of the embedded resource into the appropriate format in anticipation of the client request.

If the answer at block 704 is no, processing continues at block 706 where the DNS server component performs a test to determine whether the identified pre-processing information includes identification of any non-cacheable content, such as content not typically stored by the resource cache component 128 of the CDN service provider 106. This type of content would need to be obtained by the resource cache component 128 of the CDN service provider 106 from another source, such as the origin server 114 of the content provider 114. Dynamic content, for example, is often considered non-cacheable content in this context.

If the answer at block 706 is yes, the DNS server component transmits pre-processing information to the origin server 114 of the content provider 104. In one embodiment, the pre-processing information includes instructions or identification of the non-cacheable content for the origin server 114 to preload to the resource cache component 128 in anticipation of a request from the client computing device 102 for the non-cacheable content. In another embodiment, the pre-processing information may simply include instructions or information for the origin server 114 to open a communications channel with the resource cache component 128 in anticipation of the request for the non-cacheable content from the resource cache component 128. Processing of the subroutine ends at block 710. In addition, if the answer at block 706 is no, processing of the subroutine also ends at block 710.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
   receiving a DNS query from a client computing device at a DNS server component, wherein the DNS query corresponds to a Web page associated with a resource identifier;
   determining, at the DNS server component, pre-processing information from the DNS query, wherein the pre-processing information includes identification of an embedded resource of the Web page and instructions to reset a time to live associated with a communications channel;
   resolving the DNS query by selecting a cache server component for providing the Web page to the client computing device and transmitting information identifying the selected cache server component to the client computing device, wherein the DNS server component and the cache server component are different; and
   implementing, at the DNS server component, the pre-processing information by identifying the embedded resource and the instructions and providing, to the cache server component in advance of a subsequent request from the client computing device for the embedded resource, the pre-processing information.

2. The method as recited in claim 1, wherein the resource identifier comprises a uniform resource locator (URL).

3. The method as recited in claim 1, wherein the pre-processing information includes instructions to preload dynamic content.

4. The method as recited in claim 1, wherein the pre-processing information includes instructions to open the communications channel.

5. The method as recited in claim 1, wherein pre-processing information includes instructions to open multiple communications channels in order to handle the subsequent request for the embedded resource.

6. The method as recited in claim 1, wherein the pre-processing information includes instructions to enable pre-processing of the embedded resource at a particular resolution.

7. The method as recited in claim 1, wherein the pre-processing information includes instructions to commence transcoding the embedded resource into a particular format.

8. The method as recited in claim 1, wherein the pre-processing information includes instructions to the selected cache server component to open a communications channel between two or more nodes of a content delivery network associated with the selected cache server component.

9. The method as recited in claim 1, wherein implementing the identified pre-processing information further comprises transmitting instructions to the selected cache server component to open a communications channel between the selected cache server component and an origin server of an original content provider.

10. The method as recited in claim 1, wherein implementing the identified pre-processing information further comprises transmitting instructions to an original content provider to open a communications channel between an origin server of the original content provider and the selected cache server component.

11. A system comprising:
a DNS server component implemented by a computing device, wherein the DNS server component is operable to:
receive a DNS query from a client computing device at a DNS server, wherein the DNS query corresponds to a Web page associated with a resource identifier;
identify pre-processing information from the resource identifier corresponding to the DNS query, wherein the pre-processing information includes identification of an embedded resource of the Web page and identification of instructions to reset a time to live associated with a communications channel;
resolve the DNS query by selecting a cache server component for providing the Web page to the client computing device and transmitting information identifying the selected cache server component to the client computing device, wherein the DNS server component and the cache server component are different; and
implement the pre-processing information by identifying the embedded resource and the instructions and providing, to the cache server component in advance of a subsequent request from the client computing device for the embedded resource, the pre-processing information.

12. The system as recited in claim 11, wherein the resource identifier comprises a uniform resource locator (URL).

13. The system as recited in claim 11, wherein the pre-processing information includes instructions to open the communications channel.

14. The system as recited in claim 11, wherein pre-processing information includes instructions to open multiple communications channels in order to handle the subsequent request for the embedded resource.

15. The system as recited in claim 11, wherein the pre-processing information includes instructions to enable pre-processing of the embedded resource at a particular resolution.

16. The system as recited in claim 11, wherein the pre-processing information includes instructions to commence transcoding the embedded resource into a particular format.

17. The system as recited in claim 11, wherein the pre-processing information includes instructions to the selected cache server component to open a communications channel between two or more nodes of a content delivery network associated with the selected cache server component.

18. The system as recited in claim 11, wherein the pre-processing information includes identification of an origin server corresponding to the embedded resource.

19. The system as recited in claim 18, wherein implementing the identified pre-processing information further comprises transmitting instructions to the selected cache server component to open a communications channel between the selected cache server component and the origin server.

20. The system as recited in claim 18, wherein implementing the identified pre-processing information further comprises transmitting instructions to an original content provider to open a communications channel between the origin server and the selected cache server component.

* * * * *